US 6,578,999 B2

(12) United States Patent
Schmidt et al.

(10) Patent No.: US 6,578,999 B2
(45) Date of Patent: Jun. 17, 2003

(54) DEVICE FOR GENERATING A QUADRANGULAR ILLUMINATING FIELD AND USE OF SUCH DEVICE IN AN OPTICAL DEVICE COMPRISING A SURFACE TO BE ILLUMINATED HAVING A PREDETERMINED SHAPE (75) Inventors: Dietrich Schmidt, Jena (DE); Christfried Symanowski, Jena (DE); Gudrun Schroeter, Jena (DE)

(73) Assignee: Carl Zeiss Jena GmbH (DE)

( * ) Notice: Subject to any disclaimer, the term of this patent is extended or adjusted under 35 U.S.C. 154(b) by 0 days.

(21) Appl. No.: 10/041,008

(22) Filed: Jan. 7, 2002

(65) Prior Publication Data

US 2002/0114167 A1 Aug. 22, 2002

(51) Int. Cl.$^7$ ............................................... F21V 8/00
(52) U.S. Cl. ........................ 362/556; 385/146; 362/551
(58) Field of Search .................... 385/146; 362/551, 362/556, 582

(56) References Cited

U.S. PATENT DOCUMENTS

| 3,676,667 | A | | 7/1972 | Malifaud | 240/41.35 |
|---|---|---|---|---|---|
| 4,750,798 | A | * | 6/1988 | Whitehead | 360/96.1 |
| 4,813,765 | A | | 3/1989 | Negishi | 350/286 |
| 5,978,051 | A | | 11/1999 | Gohman et al. | 348/766 |
| 6,371,617 | B1 | * | 4/2002 | Nishida et al. | 353/122 |
| 6,473,555 | B1 | * | 10/2002 | Kragl et al. | 385/146 |

FOREIGN PATENT DOCUMENTS

| DE | 0562873 A1 | 3/1993 |
|---|---|---|
| DE | 0764862 A1 | 9/1996 |
| WO | WO 01/82632 A1 | 4/2001 |

* cited by examiner

Primary Examiner—Laura K. Tso
(74) Attorney, Agent, or Firm—Eugene E. Renz, Jr.

(57) ABSTRACT

In a device for generating a quadrangular illuminating field, having a light mixing rod, which has a quadrangular cross-section as well as a quadrangular inlet area and a quadrangular outlet area and guides light coupled in via the inlet area to the outlet area, in order to generate therein the quadrangular illuminating field, the outlet area is limited by four rectilinear sides, of which two each meet in one of the corners of the outlet area, and, in one or two corners, the sides meeting therein converge at right angles while, in the other corners, the sides meeting therein converge at an angle, which is not equal to 90°.

12 Claims, 6 Drawing Sheets

DEVICE FOR GENERATING A QUADRANGULAR ILLUMINATING FIELD AND USE OF SUCH DEVICE IN AN OPTICAL DEVICE COMPRISING A SURFACE TO BE ILLUMINATED HAVING A PREDETERMINED SHAPE

CROSS-REFERENCE TO RELATED APPLICATION

This application claims priority of German patent application no. 101 03 098.3, filed Jan. 24, 2001, the complete disclosure of which is hereby incorporated by reference.

FIELD OF THE INVENTION

The invention relates to a device for generating a quadrangular illuminating field, having a light mixing rod, which has a quadrangular cross-section as well as a quadrangular inlet area and a quadrangular outlet area and guides light coupled in via the inlet area to the outlet area, in order to generate therein the quadrangular illuminating field, said outlet area being limited by four rectilinear sides, of which two each converge in one of the corners of the outlet area. The invention further relates to the use of such device for generating a quadrangular illuminating field in an optical device comprising a surface to be illuminated, which has a predetermined shape, and illumination optics, which form an image of the outlet area on the surface to be illuminated.

BACKGROUND OF THE INVENTION

Such device for generating a quadrangular illuminating field is employed, for example, in the illumination optics of a digital projector, as it is called, which also comprises, in addition to the illumination optics, a generally rectangular imaging element, such as a tilting mirror matrix or an LCD matrix, and projection optics for projecting the image generated by the imaging element. In such a digital projector, it is required for high-quality images that the imaging element be illuminated as uniformly as possible by the illumination optics. Therefore, the illumination optics contain the light mixing rod, whose outlet area conventionally has a rectangular shape, if the imaging element is rectangular. It has been found, however, that a complicated optical system is necessary for forming an image of the illuminating field in the outlet area of the light mixing rod on the imaging element, so as to ensure that the image is formed in a manner as free from distortion as possible. In many cases, this also raises the additional problem that the outlet area and the surface of the imaging element are not situated in planes which are parallel to each other, but are inclined relative to each other, which also causes distortions leading to decreased uniformity of the illumination of the imaging element.

OBJECT AND SUMMARY OF THE INVENTION

Therefore, it is an object of the invention to improve the above-described type of device for generating a quadrangular illuminating field such that it allows illuminating, as uniformly as possible, a surface which is to be illuminated and has a predetermined shape.

According to the invention, this object is achieved, in connection with the above-described type of device for generating a quadrangular illuminating field, in that the sides meeting in one or two corners converge at a right angle and the sides meeting in the remaining corners converge at an angle which is not equal to 90°. Thus, the shape of the outlet area of the light mixing rod may be selected such that the distortion caused by forming an image of the outlet area on the surface to be illuminated is compensated and the surface to be illuminated is uniformly illuminated. The light mixing rod may preferably extend rectilinearly or at an angle.

Since the outlet area, and preferably also the remaining cross-sectional areas of the light mixing rod, comprises one or two right angles, the production of the light mixing rod is simplified. In particular, if the four sides of each cross-sectional area of the light mixing rod converge at the same angles as the sides of the outlet area, the light mixing rod may easily be produced with the required accuracy. If it is a solid mixing rod, it may be formed by grinding and polishing a blank. If it is a hollow mixing rod, it may be produced from four reflectively coated plates.

Moreover, the device according to the invention may be further embodied such that the cross-sectional area of the light mixing rod decreases from the inlet area to the outlet area. Since, in a light mixing rod, the product of the inlet area with the aperture of the inlet area equals the product of the outlet area with the aperture of the outlet area, a larger aperture is possible at the outlet area. At the same time, the inlet area may be large, which facilitates the coupling-in of the light in the light mixing rod.

A particularly advantageous further embodiment of the device according to the invention consists in that the light mixing rod is made of a light-transparent material and is, consequently, a solid mixing rod, in which the light which does not travel directly from the inlet area to the outlet area is guided by total reflexion. Since no losses occur in said total reflexion and, consequently, only the losses caused by material absorption are present, nearly all of the coupled-in light is guided to the outlet area, so that a very high efficiency in light transmission is realized. Moreover, it is also an advantage that excessive heating of the light mixing rod is prevented because total reflexion involves no losses which might contribute to such heating.

A particular further embodiment of the device according to the invention consists in that the light mixing rod has a hollow cross-section, which is formed by four reflective surfaces extending from the inlet area to the outlet area. This configuration of the light mixing rod allows simple and accurate production. A further particular advantage of this embodiment is that the outlet area is not formed by an end surface of the material, from which the light mixing rod is produced, but is the region at the end of the light mixing rod between the four reflective surfaces, thus usually an air portion, since the light mixing rod is conventionally present in a surrounding atmosphere and thus in air. This leads to the advantage that on the outlet area no soiling or misting can form, which might adversely affect the uniformity of the generated quadrangular illuminating field.

In particular, the device according to the invention may be further embodied such that the light mixing rod comprises a solid mixing rod portion made of a light-transparent material and an end portion optically coupled therewith, which is provided with reflective surfaces and has a hollow cross-section and whose end averted from the solid mixing rod portion forms the outlet or inlet area. As the outlet or inlet area is formed by the end of the end portion averted from the solid mixing rod portion, this prevents that soiling or misting may accumulate in this area, so that the illuminating field generated in the outlet area is not adversely affected.

In a further preferred embodiment of the device according to the invention, the reflective surfaces partially extend across the solid mixing rod portion. This allows particularly simple production of the light mixing rod. Thus, the reflective surfaces may, for example, be joined with the solid mixing rod portion using an optical cement which is transparent to light. Advantageously, this type of joint does not require a further holding device or socket for the end portion.

Moreover, the device according to the invention may be further embodied such that the cross-sectional area of the end portion is greater than that of the solid mixing rod portion. Thus, a device is provided for generating a quadrangular illuminating field having a light mixing rod, which device allows the cross-sectional area to be easily changed. If the reflective surfaces, according to this further embodiment, also partially overlap the solid mixing rod portion, the end portion may be arranged such that it does not contact the solid mixing rod portion and that a gap is present between them. This has the advantageous effect that the overlapping part of the end portion does not eliminate the total reflexion of the solid mixing rod portion in this region.

A particularly advantageous embodiment of the device according to the invention consists in that the light mixing rod comprises a starting portion provided with reflective surfaces, which has a hollow cross-section and whose end averted from the solid mixing rod portion forms the inlet area. This light rod allows to effectively prevent soiling and misting from forming in both the inlet and the outlet area and thus also to prevent any deterioration of the optical properties of the light mixing rod.

The device according to the invention may also be further embodied such that the light mixing rod comprises a first and second light guiding region for separately guiding components of the coupled-in light due to a partition extending from the inlet area to the outlet area. Thus, it is possible to create an intentional non-uniformity of the luminance in the illuminating field. This non-uniformity may be adapted to uniformly illuminate the surface to be illuminated.

Moreover, the device according to the invention may be used to generate a quadrangular illuminating field, in particular in an optical device comprising a surface to be illuminated, which has a predetermined shape, and illumination optics, which form an image of the outlet area on the surface to be illuminated. Preferably, projection optics for forming an image of the surface to be illuminated on a projection surface are also provided. Thus, an optical device is provided wherein a more uniform illumination of the surface to be illuminated is possible due to the device according to the invention, because the distortions caused by the illumination optics may be compensated by suitably selecting the shape of the quadrangular outlet area of the light mixing rod.

The invention will be explained below by way of example and with reference to the drawings.

BRIEF DESCRIPTION OF THE DRAWINGS

These and other objects of the present invention and various features and details of the operation and construction thereof are hereinafter more fully set forth with reference to the accompanying drawings, wherein.

DETAILED DESCRIPTION OF THE PREFERRED EMBODIMENTS

Figure 3:
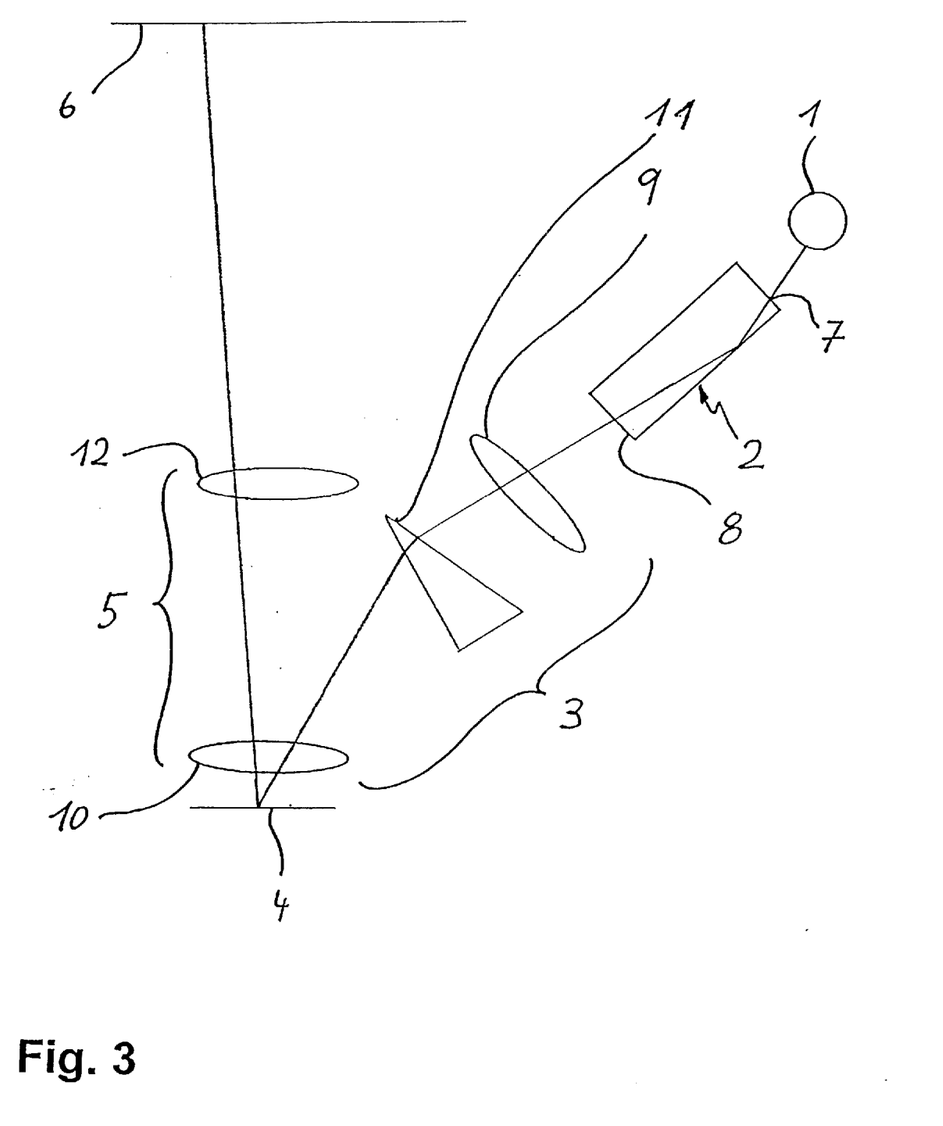
FIG. 3 is a schematic representation of an optical device according to the invention, which comprises the light mixing rod according to the invention as shown in FIGS. 1 and 2.

FIG. 3 shows a schematic top view of a projection device according to the invention, wherein a ray path is indicated by way of example. The projection device contains a light source 1, a light mixing rod 2, into which light from the light source 1 may be coupled, and, subsequent to the light mixing rod 2, illumination optics 3 which can illuminate a surface 4 to be illuminated by the light exiting from the light mixing rod 2. The surface 4 to be illuminated is preferably an imaging element and may, for example, be a tilting mirror matrix or an LCD matrix having a quadrangular, in particular a rectangular or square, shape. The projection device further comprises projection optics 5, by which the surface 4 to be illuminated may be projected onto a projection surface 6.

The light mixing rod 2 comprises an inlet area 7 facing the light source 1 and an outlet area 8 facing the illumination optics 3. It is arranged such that the outlet area 8 is not parallel to the surface 4 to be illuminated, but encloses an angle therewith, both in the top view shown in FIG. 3 and in a side view of the projection device.

The illumination optics 3 are designed such that an image of the outlet area 8 is formed on the surface 4 to be illuminated, and, to this end, they are provided with lens units 9, 10 and a deflecting prism 11. In the deflecting prism 11, the light exiting from the light mixing rod 2 is deflected only by refraction, and not by reflexion.

The projection optics 5 comprise the lens unit 10 and a further lens unit 12. By the use of the deflecting prism 11 and by employing the lens unit 10 for both the illumination optics 3 and the projection optics 5, a very compact projection device may be formed.

Figure 1:
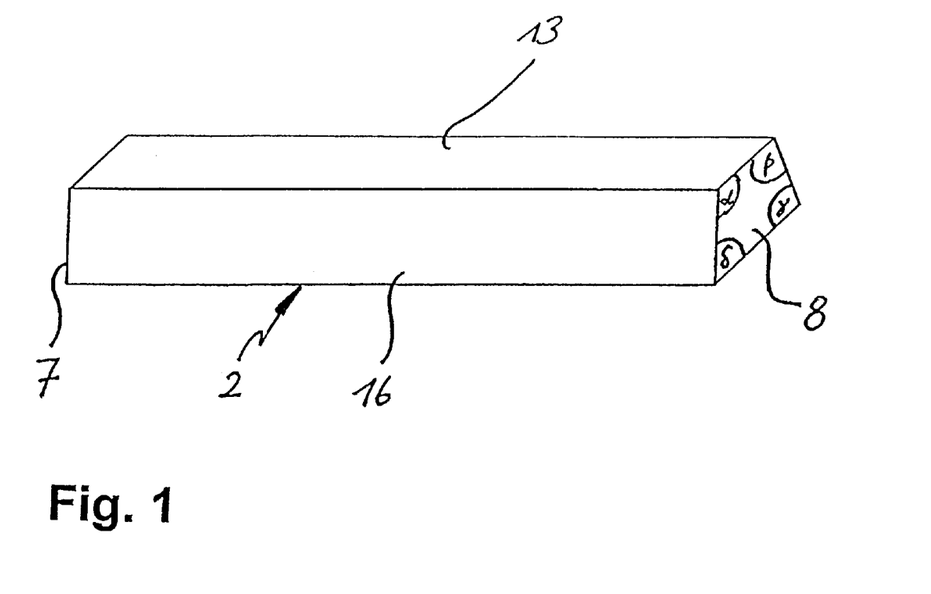
FIG. 1 is a perspective view of a light mixing rod according to the invention.
Figure 2:
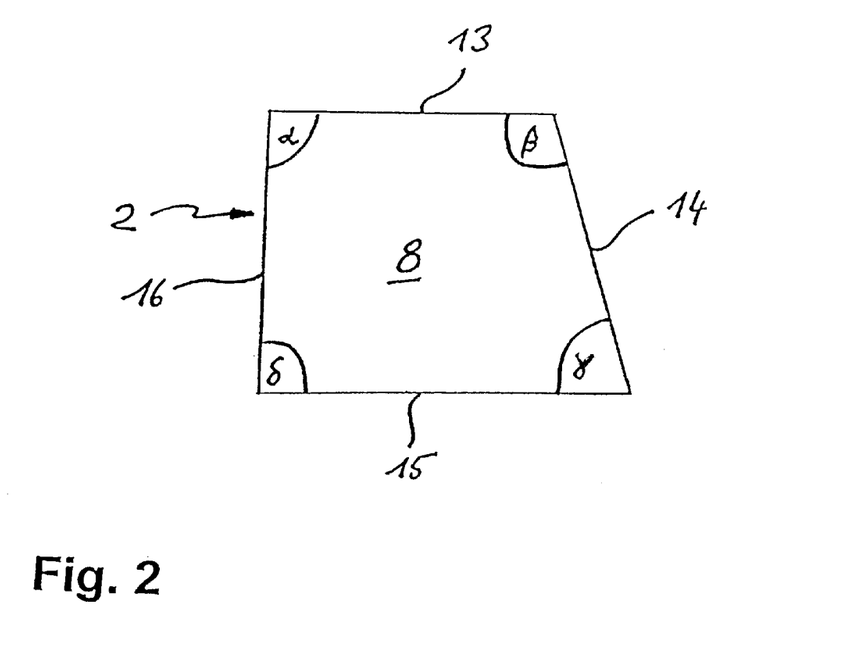
FIG. 2 is a front view of the light mixing rod according to the invention as shown in FIG. 1.

As best shown in FIGS. 1 and 2, the light mixing rod 2 consists of material transparent to light from the light source 1, has a solid cross-section and, by total reflexion at the interfaces between the side surfaces 13, 14, 15 and 16 of the light mixing rod 2 and the surrounding area, guides those light rays from the inlet area 7 to the outlet area 8 which do not travel directly from the inlet area 7 to the outlet area 8. Such a light mixing rod 2 is referred to as a "solid mixing rod".

The shape of the light mixing rod 2 is selected to have a quadrangular cross-section, wherein, in the case of the quadrangular outlet area 8, two interior angles $\alpha$, $\delta$ circumferentially adjacent to the outlet area 8 have a value of 90°, while a further interior angle γ is greater than 90°, and the last interior angle is less than 90°. The interior angles α, β, γ, δ are selected such that the distortion in the image of the outlet area 8, which distortion is caused by the position of the outlet area 8 of the light mixing rod 2 relative to the surface 4 to be illuminated and by the illumination optics 3, is compensated so as to uniformly illuminate the surface 4 to be illuminated, which is a rectangular surface in this case. Preferably, the illumination optics 3 and the light mixing rod 2 are designed such that the surface 4 to be illuminated is slightly over-illuminated, i.e. the image of the outlet area 8 is somewhat larger than the surface 4 to be illuminated and protrudes on all four sides of the surface 4 to be illuminated. Thus, for example, the illumination of the surface 4 to be illuminated is ensured if the image of the outlet area still differs slightly from the rectangular shape or if the orientation of the surface 4 to be illuminated is not optimal.

The solid mixing rod 2 may be produced, for example, from a parallelepiped blank by grinding and polishing.

Figure 4:
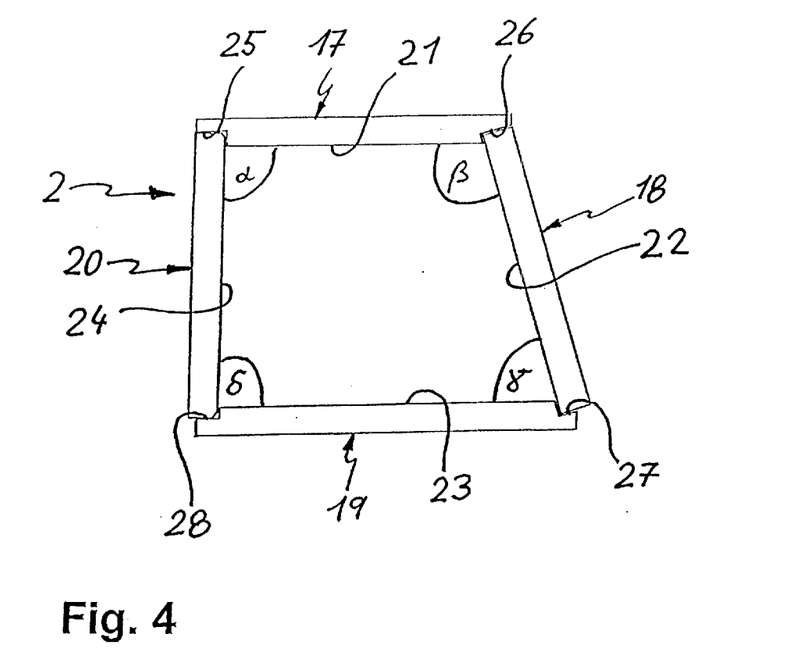
FIG. 4 is a front view of a light mixing rod of the invention according to another embodiment.

Alternatively, the light mixing rod 2 may be provided as a hollow mixing rod, as shown in FIG. 4. In this embodiment, the mixing rod is formed by four side plates 17, 18, 19 and 20, whose internal surfaces 21, 22, 23 and 24 are reflectively coated.

The four side plates 17 to 20 each form a substantially rectangular cross-section, with the side plates 17 and 19 being provided, at their inner surfaces 21, 23, at both ends, with recesses 25, 26, 27 and 28 which extend from the inlet area 7 to the outlet area 8. These recesses 25, 26, 27, 28, into which the side plates 18 and 20 are inserted, are designed such that the desired interior angles α, β, γ, δ are present in the assembled state shown in FIG. 4. Preferably, the side plates 17 to 20 are held together by fitting a piece of shrink tubing (not shown) over the side plates in their assembled state shown in FIG. 4, which tubing is then heated and contracts so that the side plates 17 to 20 are urged together by elastic pretension. This shrink tubing may be disposed, for example, in a central portion of the light mixing rod 2. There may also be provided two pieces of shrink tubing, one in a region adjacent to the inlet area 7 and one in a region adjacent to the outlet area 8.

Figure 5:
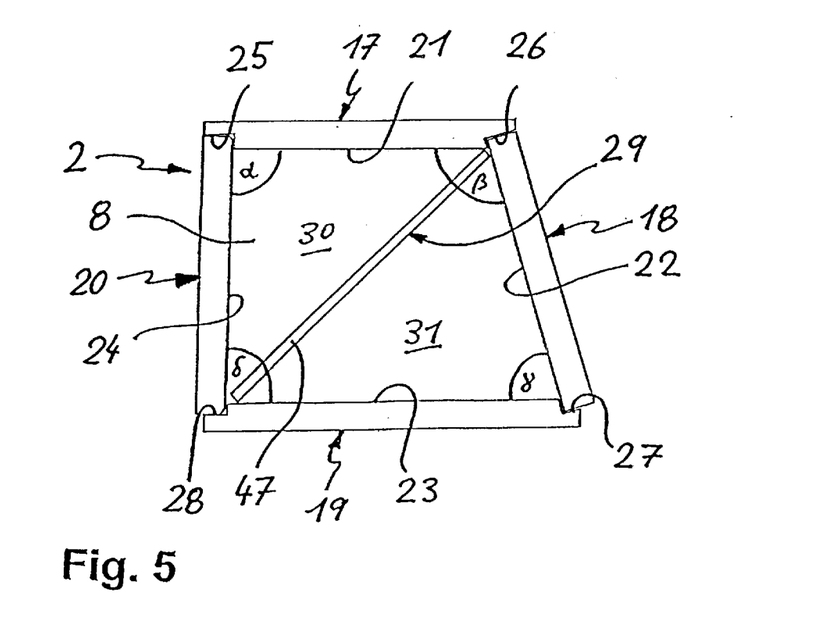
FIG. 5 is a front view of a further embodiment of the light mixing rod of FIG. 4.

FIG. 5 shows a further embodiment of the hollow mixing rod shown in FIG. 4. In this further embodiment, a partition is provided which is formed by a plate 29 reflectively coated on both sides and extends from the inlet area 7 toward the outlet area 8 and, as shown in FIG. 5, is disposed diagonally, in cross-section, in the light mixing rod 2. This plate 29, which is reflectively coated on both sides, preferably extends a predetermined distance into the light mixing rod 2 from the inlet area 7, which predetermined distance may one half to one third of the length of the light mixing rod 2. By this partition, first and second light guiding regions 30 and 31 are formed, each of which has a triangular shape in cross-section. Due to this cross-sectional shape, the luminance distribution at the end of the light guiding regions 30 and 31 is different than it is in the same place in the light mixing rod shown in FIG. 4, so that the luminance distribution in the outlet area 8 also differs from that of the light mixing rod 2 shown in FIG. 4. Thus, said partition leads to an intentional inhomogenization of the luminance distribution in the outlet area 8, which effect is even stronger as the length of the plate 29 increases. This may be employed, e.g. in the case of the projection device shown in FIG. 3, to illuminate the surface 4 to be illuminated even more uniformly. The plate 29 is preferably disposed in the hollow mixing rod such that its front side 47 facing the outlet area 8 is not situated in the outlet area 8, but inside the hollow mixing rod. The front side 47 and the corresponding opposite front side at the other end of the plate may be polished and plane, if the plate 29 is made of a light-transparent material, so that the plate 29 serves as a light guide for the light incident on the opposite front side. Then, only the minor losses of reflection and absorption occur, so that the plate 29 advantageously causes only very minor losses. Alternatively, the opposite front side may also be blackened, so that the light incident thereon is not passed on, but is blocked.

In a further preferred embodiment of the invention, such partition, in accordance with the embodiment of FIG. 5, may also be provided in a solid mixing rod. To this end, the starting portion of the light mixing rod 2, which is to be provided with the partition, is formed by two prisms separated from each other by a gap. At the interfaces between the prism surfaces and the gap, total reflexion of light beams having predetermined angles occurs, so that the gap between the prisms also provides a partition leading to the inhomogenization of the luminance distribution in the outlet area 8.

Figure 6:
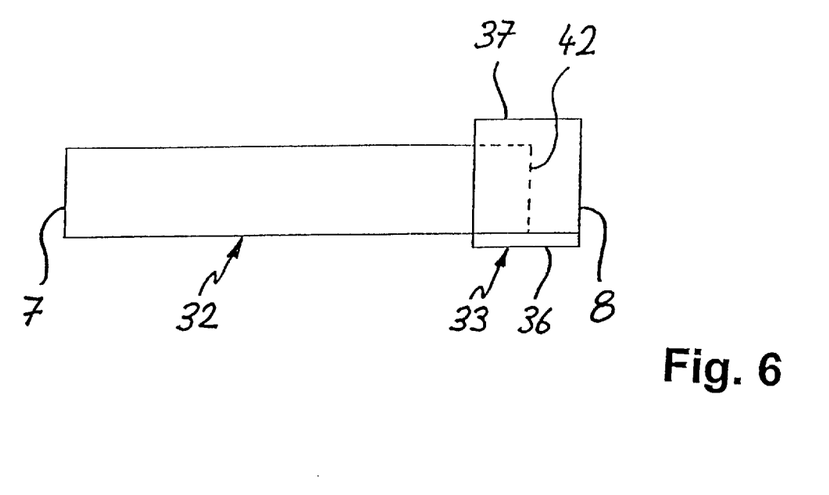
FIG. 6 is a side view of a light mixing rod of the invention according to another embodiment.
Figure 7:
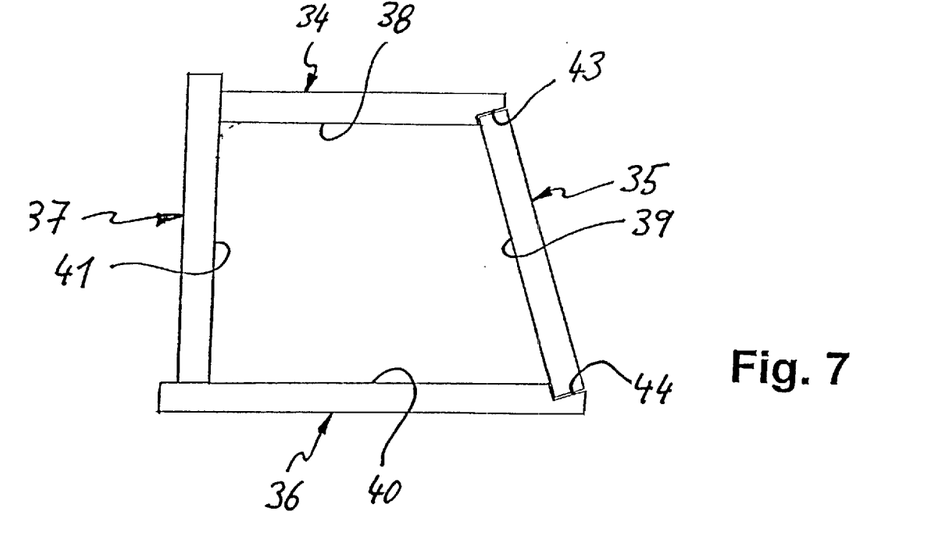
FIG. 7 is a front view of a light mixing rod shown in FIG. 6.

FIGS. 6 and 7 show a further embodiment of the light mixing rod 2 according to the invention. In this embodiment, the light mixing rod 2 comprises a solid mixing rod portion 32, made of a light-transparent material, such as glass, and having a solid cross-section, and an end portion 33, which is optically coupled with the solid mixing rod portion 32 at the outlet end thereof.

As best shown in FIG. 7, the end portion 33 has a hollow cross-section, which is limited by four plates 34, 35, 36, 37. The inner sides 38, 39, 40, 41 of the plates 34 to 37 are reflectively coated, and the end of the end portion 33 averted from the inlet area 7 forms the outlet area 8. On the side where the interior angles are not equal to 90°, the opposed plates 34 and 36 comprise recesses 43, 44 which extend in the longitudinal direction of the light mixing rod 2 and in which the plate 35 is guided. The recesses 43 and 44 are formed such that the desired interior angles β, γ are present in the outlet area 8 of the light mixing rod 2. The right angle between the plates 34 and 37 may be realized in that the side surface of the plate 34 supported on the inner side 41 of the plate 37 extends perpendicularly to the inner side 38 of the plate 34. The right angle between the plates 37 and 36 may be realized in the same manner, as shown in FIG. 7.

The plates 34 to 37 are arranged such that the inner sides 38 to 41 extend perpendicularly to an end surface 42 of the solid mixing rod portion 32 opposed to the inlet area 7, so that the light mixing rod 2 also extends rectilinearly. Of course, the plates 34 to 37 may also be arranged such that the inner sides 38 to 41 do not extend at a right angle, but at a different angle to the end surface 42. In this case, the light mixing rod 2 will be bent.

As best shown in FIG. 6, the plates 34 to 37 extend, partially across the solid mixing rod portion 32, in the longitudinal direction of the light mixing rod 2, so that the end portion 33 partially overlaps the solid mixing rod portion 32. The plates 34 to 37 are fixed to the solid mixing rod portion 32 using an optical cement. Alternatively, instead of using the optical cement, a piece of shrink tubing (not shown) may be fitted over the plates 34 to 37, preferably in the region of the solid mixing rod portion 32, and then heated so as to contract such that the plates 34 to 37 are urged against the solid mixing rod portion 32 by elastic pretension and thus fixed thereto. In this light mixing rod 2, the plates 34 to 37 eliminate total reflexion in their region of contact with the solid mixing rod portion 32 and, instead, cause reflexions at the reflectively coated inner sides 38 to 41.

The light mixing rod 2 is preferably designed such that, in the condition shown in FIG. 6, the length of the part of the end portion 33 (i.e. the protruding hollow portion) protruding from the solid mixing rod portion 32 in the longitudinal direction of the light mixing rod 2 is greater than the depth of focus of the illumination optics 3. Preferably, the length of the protruding part is at least one order of magnitude greater than the depth of focus. This ensures that any soiling or misting on the end surface 42 of the solid mixing rod portion 32 will not lead to a substantial deterioriation in the illumination of the surface to be illuminated.

The light mixing rod 2 shown in FIGS. 6 and 7 extends rectilinearly. However, for example, it may be bent somewhere along the solid mixing rod portion 32. It is essential that the light mixture of the coupled-in light be effected substantially in the solid mixing rod portion 32 so as to benefit from the advantage of the very small transmission losses of a solid mixing rod, and that the outlet area 8 be defined in such a manner by the end portion 33 having the hollow cross-section that the outlet area 8 is always free from misting and soiling. The contribution of the end portion 31 to the light mixture depends on its length and increases as its length increases.

In this embodiment, the light mixing rod may be supported by a holding device, which only engages the end portion 33. This holding device is preferably connected with the external surfaces of the four plates 34 to 37 and does not have an adverse effect on the light mixture, since it does not affect the inner sides 38 to 41 of the plates 34 to 37. If the size of the overlapping part of the end portion 33 does not suffice to hold the light rod by a holding device which only engages the end portion 33, a further holding device may be provided which engages the solid mixing rod portion 32. However, since such a holding device eliminates total reflexion in the region of contact with the solid mixing rod portion 32, this will always lead to undesired losses. The latter may be reduced by reflectively coating the part of the holding device contacting the solid mixing portion 32. However, also in this case, there is the advantage that the losses caused by the holding device are smaller than in a pure solid mixing rod, since the latter is usually supported by a holding device engaging at least two locations of the solid mixing rod spaced apart from each other in the longitudinal direction, thus causing losses at these two locations. Consequently, the losses caused by the holding device may be advantageously reduced in the light mixing rod shown in FIG. 6.

Figure 8:
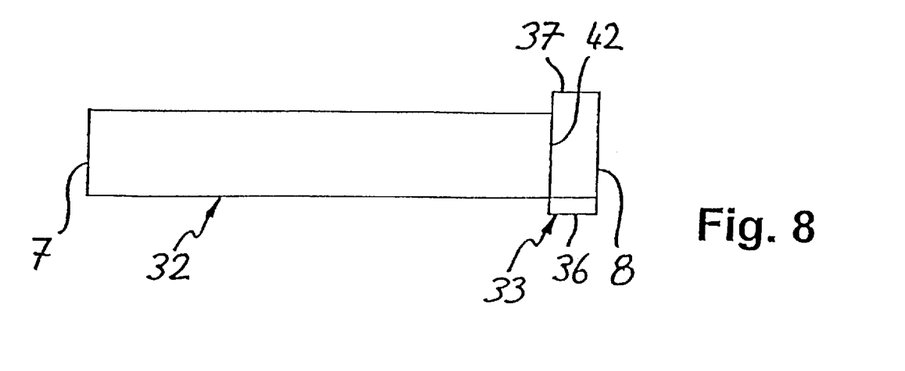
FIG. 8 is a side view of a light mixing rod of the invention according to a further embodiment.

In a further embodiment of the light mixing rod 2 according to the invention, there is no overlap of the solid mixing rod portion 32 by the end portion 33, as shown in FIG. 8. In this embodiment, the end surface 42 of the solid mixing rod portion 32 lies in the same plane as the inlet area of the end portions 33, so that there are no losses of light at the transition between the solid mixing rod portion 32 and the end portion 33. Further, total reflexion is not eliminated in any region of the solid mixing rod portion 32.

Figure 9:
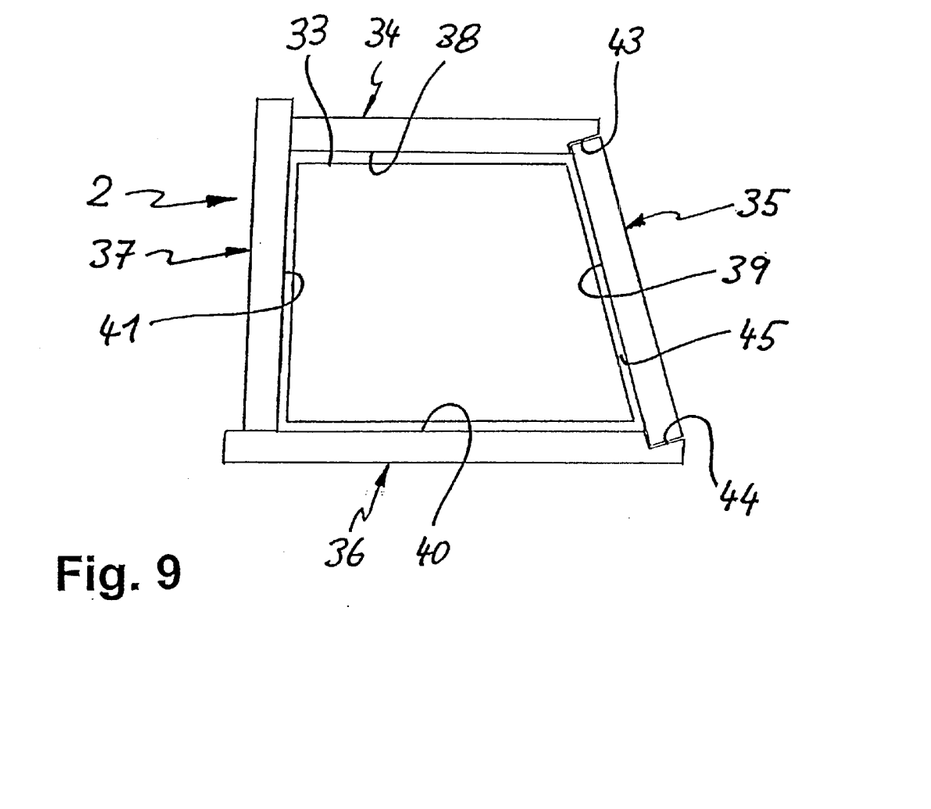
FIG. 9 is a front view of a light mixing rod of the invention according to a further embodiment.

FIG. 9 shows a further embodiment of the light mixing rod 2 according to the invention. In this embodiment, the cross-sectional area of the end portion 33 is greater than the cross-sectional area of the solid mixing rod portion 32. The solid mixing rod portion 32 and the end portion 33 are arranged such that the centers of their cross-sectional areas are situated on the central longitudinal axis of the light mixing rod 2. The end portion 33 is formed, in a manner similar to that of the embodiment shown in FIG. 7, by four plates 34 to 37. If the end portion 33 overlaps the solid mixing rod portion 32, this will result in a circumferentially extending gap 45 being present in the overlapping region between the solid mixing rod portion 32 and the end portion 33. Consequently, the light in the light mixing rod 2 will be guided to the end surface 42 of the solid mixing rod portion 32 by total reflexion and will be guided by reflexion at the plates 34 to 37 only in the protruding hollow portion of the end portion 33. Thus, the losses caused by the reflexion at the plates 34 to 37 will be reduced in comparison to the light mixing rod 2 shown in FIGS. 6 and 7.

Alternatively, the light mixing rod 2 according to the invention may also be used such that the end portion 33 faces the light source 1 and that its end forms the inlet area 7 (thus, the inlet and outlet areas have been changed around as compared with the embodiment shown in FIG. 3). This will reduce the thermal stresses on the material of the light mixing rod 2, since the secondary focus of the light source 1, in the optical device shown in FIG. 3, is situated in the plane of the inlet area 7, which, due to the hollow cross-section of the end portion 33, is not a material end surface of the light mixing rod 2.

Figure 10:
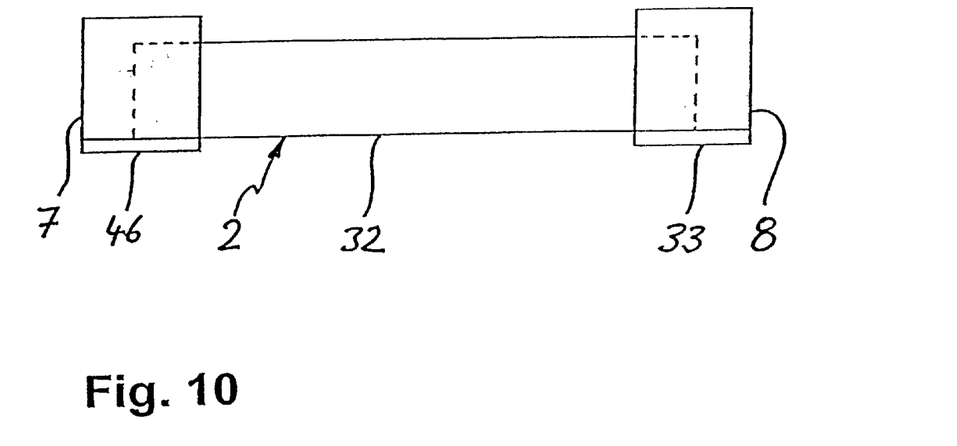
FIG. 10 is a side view of a light mixing rod of the invention according to a further embodiment.

In a further embodiment of the light mixing rod 2 according to the invention, the solid mixing rod portion 32 is provided with an end portion 33 and a starting portion 46 at its opposite ends in the longitudinal direction, as shown in FIG. 10. As shown by way of example in FIG. 10, the starting and end portions 46, 33 may both be designed as in the embodiment shown in FIGS. 6 and 7. However, they may also be provided as in the other embodiments described herein, and may, in particular, be different from each other. In such a light mixing rod 2, both the inlet area 7 and the outlet area 8 are formed in air, thus combining the above-described advantages of such inlet and outlet areas.

If, in this embodiment, both the end portion 33 and the starting portion 46 contact the solid mixing rod portion 32, the light mixing rod 2 may be held by a holding device, which engages the end portion 33, on the one hand, and the starting portion 46, on the other hand, so that no losses are caused by the holding device, because the holding device may be connected with the external plate surfaces of the end portions 33 and of the starting portion 46, and these external surfaces are not involved in the light mixture.

Figure 11:
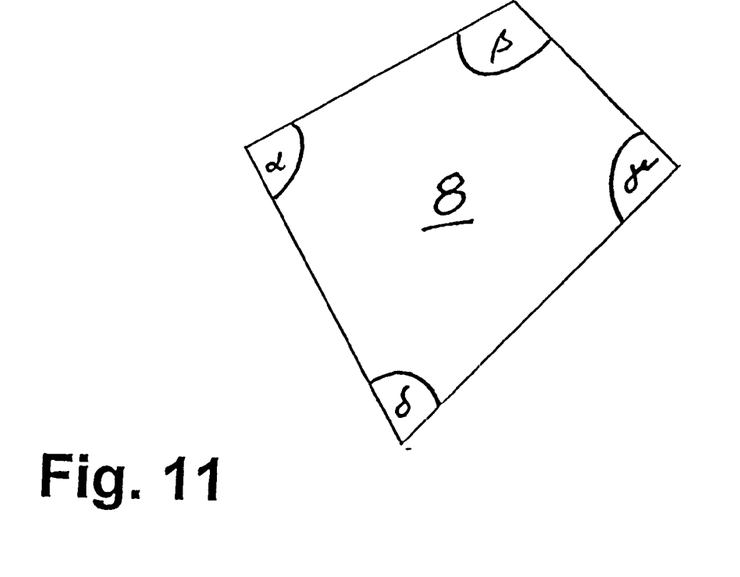
FIG. 11 is a front view of a light mixing rod of the invention according to a further embodiment.

The cross-sectional shape of the quadrangular light mixing rod 2 is not restricted to the shape shown in FIG. 2. Thus, for example, the two opposite interior angles α and γ may also be right angles as shown in FIG. 11. In the example represented therein, the angle β will then be greater than 90° and the angle δ will be less than 90°.

Figure 12:
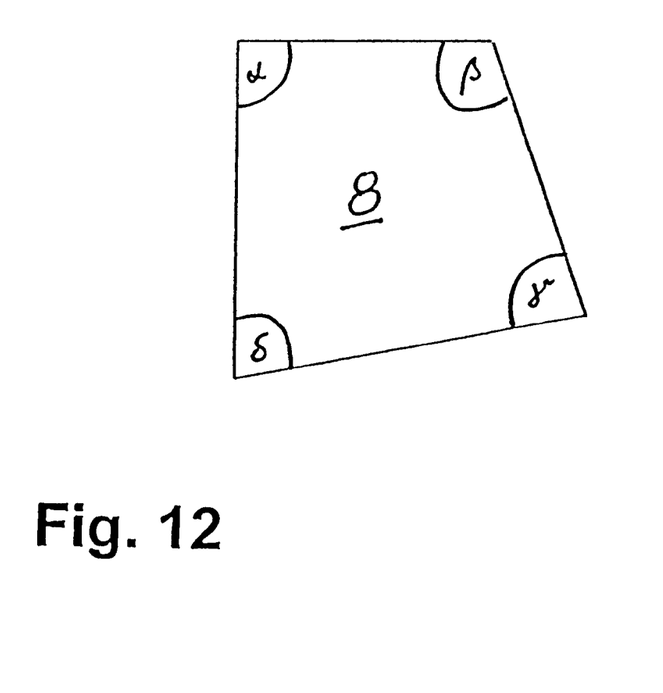
FIG. 12 is a front view of a light mixing rod of the invention according to a further embodiment.

Alternatively, the light mixing rod 2 according to the invention may also have a cross-sectional shape in which only one right angle is present in the outlet area 8, as shown in FIG. 12. In the embodiment shown in said FIG., only the angle α is a right angle, while the other angles β, γ and δ are not equal to 90°.

What is claimed is:

1. A device for generating a quadrangular illuminating field, having a light mixing rod, which has a quadrangular cross-section as well as a quadrangular inlet area and a quadrangular outlet area, and guides light coupled in via the inlet area to the outlet area, in order to generate therein the quadrangular illuminating field, said outlet area being limited by four rectilinear sides, of which two each meet in one of the corners of the outlet area, wherein, in one or two corners, the sides meeting therein converge at right angles and, in the other corners, the sides meeting therein converge at an angle, which is not equal to 90°.

2. The device as claimed in claim 1, wherein the light mixing rod is formed such that each of its cross-sectional areas is limited by four rectilinear sides, which converge at the same angles as the sides of the outlet area.

3. The device as claimed in claim 1, wherein the cross-sectional area of the light mixing rod decreases from the inlet area toward the outlet area.

4. The device as claimed in claim 1, wherein the light mixing rod has a hollow cross-section, which is formed by four reflective surfaces extending from its inlet area to the outlet area.

5. The device as claimed in claim 1, wherein the light mixing rod is a solid mixing rod made of a light-transparent material.

6. The device as claimed in claim 1, wherein the light mixing rod comprises a solid mixing rod portion of a light-transparent material and an end portion provided with reflective surfaces, which has a hollow cross-section, wherein the end of the end portion averted from the solid mixing rod portion forms the inlet or outlet area.

7. The device as claimed in claim 6, wherein the reflective surfaces partially extend across the solid mixing rod portion.

8. The device as claimed in claim 6, wherein the end portion has a greater cross-sectional area than the solid mixing rod portion.

9. The device as claimed in claim 6, wherein the light mixing rod comprises a starting portion provided with reflective surfaces, which has a hollow cross-section and whose end averted from the solid mixing rod portion forms the inlet area, and the end of the end portion averted from the solid mixing rod portion forms the outlet area.

10. The device as claimed in any of claims 1 to 9, wherein the light mixing rod comprises first and second light guiding regions for separately guiding components of the coupled-in light due to a partition extending from the inlet area toward the outlet area.

11. The use of a device for generating a quadrangular illuminating field as claimed in claim 1 in an optical device comprising a surface to be illuminated, which has a predetermined shape, and illumination optics, which form an image of the outlet area on the surface to be illuminated.

12. The use as claimed in claim 11, wherein the optical device further comprises projection optics for projecting the surface to be illuminated onto a projection surface.

* * * * *